US012722191B2

(12) United States Patent
Brown et al.

(10) Patent No.: US 12,722,191 B2
(45) Date of Patent: Sep. 1, 2026

(54) CLEANING DEVICE FOR SANITARY PROCESSING EQUIPMENT AND A METHOD OF MANUFACTURING THE CLEANING DEVICE

(71) Applicant: Feldmeier Equipment, Inc., Syracuse, NY (US)

(72) Inventors: Kyle A. Brown, Jamesville, NY (US); Colby W. Clark, Manlius, NY (US); Tyler E. Robillard, Oswego, NY (US)

(73) Assignee: Feldmeier Equipment, Inc., Syracuse, NY (US)

( * ) Notice: Subject to any disclaimer, the term of this patent is extended or adjusted under 35 U.S.C. 154(b) by 732 days.

(21) Appl. No.: 17/848,684

(22) Filed: Jun. 24, 2022

(65) Prior Publication Data

US 2022/0410227 A1 Dec. 29, 2022

Related U.S. Application Data

(60) Provisional application No. 63/215,668, filed on Jun. 28, 2021.

(51) Int. Cl.
*B08B 9/093* (2006.01)
*B05B 1/14* (2006.01)
*B05B 1/34* (2006.01)

(52) U.S. Cl.
CPC ................ *B08B 9/093* (2013.01); *B05B 1/14* (2013.01); *B05B 1/34* (2013.01); *B08B 2209/08* (2013.01)

(58) Field of Classification Search
CPC ..... B08B 2209/08; B08B 9/093; A62C 31/03; A62C 31/05; A62C 31/28; B05B 1/14; B05B 1/26; B05B 1/34; B05B 1/3402; B05B 1/18; A61M 2210/1067; A61M 3/0208; A61M 3/0279
USPC .................................................. 239/567, 542
See application file for complete search history.

(56) References Cited

U.S. PATENT DOCUMENTS 2,343,305 A * 3/1944 Larter ........................ B05B 1/26 239/DIG. 13
2,726,897 A * 12/1955 Dupont ................... B05B 1/267 239/11
3,104,672 A * 9/1963 Holdren .................. B08B 9/093 239/560
3,221,996 A * 12/1965 Emmert ................. A01G 25/00 239/536

(Continued)

FOREIGN PATENT DOCUMENTS

CN 201735565 U * 2/2011
CN 103480514 A * 1/2014 ............... B05B 1/18
CN 104874493 A * 9/2015 ............... B05B 1/14

OTHER PUBLICATIONS

Translation of CN-104874493-A (Year: 2015).*
CN-104874493-A, Fent et al., Sep. 2, 2015.*

*Primary Examiner* — Kevin Edward Schwartz
(74) *Attorney, Agent, or Firm* — Barclay Damon LLP

(57) ABSTRACT

A fluid cleaning device includes a spheroid-shaped member defining an internal void. The spheroid-shaped member further includes a wall defining a plurality of apertures and at least partially surrounding the internal void and an inlet orifice that receives a cleaning fluid under pressure. A tubular nozzle projects from the inlet orifice and into the internal void to mitigate fluctuation of one of the internal pressure and flow velocity of the cleaning fluid within the spheroid-shaped member.

14 Claims, 5 Drawing Sheets

(56) References Cited

U.S. PATENT DOCUMENTS

| | | | | | |
|---|---|---|---|---|---|
| 3,610,532 | A * | 10/1971 | Modrey | B08B 9/0936 | 239/533.13 |
| 5,316,218 | A * | 5/1994 | Bowen | B05B 13/0636 | 239/246 |
| 5,810,261 | A * | 9/1998 | Winters | B05B 1/265 | 239/499 |
| 5,839,667 | A * | 11/1998 | Fishcer | A62C 31/02 | 169/37 |
| 8,079,533 | B2 * | 12/2011 | Bowen | B05B 3/06 | 239/237 |
| 10,960,415 | B1 * | 3/2021 | Amato | B08B 9/0936 | |
| 2010/0276508 | A1 * | 11/2010 | Davies | F21V 23/0435 | 239/18 |
| 2013/0292497 | A1 * | 11/2013 | Allen | A01K 13/001 | 239/548 |
| 2016/0325129 | A1 * | 11/2016 | Jordan | B05B 3/06 | |
| 2020/0061402 | A1 * | 2/2020 | Hillinger | A62C 31/05 | |

* cited by examiner

CLEANING DEVICE FOR SANITARY PROCESSING EQUIPMENT AND A METHOD OF MANUFACTURING THE CLEANING DEVICE

CROSS REFERENCE TO RELATED APPLICATIONS

This application claims the benefit of and priority to U.S. Provisional Patent Application No. 63/215,668, filed on Jun. 28, 2021, the entire contents of which is incorporated herein by reference.

TECHNICAL FIELD

The present disclosure relates to a cleaning apparatus for processing equipment, and more particularly, to a new and useful cleaning device which yields superior results by providing consistent, uniform, and steady fluid streams to clean predefined target areas of the processing equipment.

BACKGROUND

The processing of fluid products in the food, dairy, and pharmaceutical industries often employ a system of tanks, vessels, pumps, pipe runs, and fluid conduits for the storage, transfer, and mixing of various ingredients used in production. Inasmuch as such food, dairy, and pharmaceutical products must be free of harmful bacteria, it will be appreciated that the processing equipment must be periodically cleaned, sanitized, and/or sterilized, i.e., flushed with a cleaning solution or steam, to remove residue and bacteria from the internal cavities, chambers, and conduits of the equipment. The ASME Bioprocessing Equipment (BPE) Standards is the industry guide for the design, manufacture, and maintenance of processing equipment used in the production of biopharmaceuticals where a defined standard of purity and bioburden control is required. The 3-A Sanitary Standards define the general requirements for sanitary (hygienic) equipment intended for processing milk, milk products, foods, food ingredients, beverages, or other edible materials. Of particular concern in each of these hygienic standards are internal areas where cleaning fluids either, cannot easily access, or flow with sufficiently high velocity, to properly clean the subject area.

A large variety of spray devices exist to clean vessels and tanks. These devices include both static and rotating options, The most commonly used device is a static spray-ball including a pre-arranged pattern of orifices or holes to direct streams of fluid solution into internal target areas of the vessel. One difficulty associated with prior art spray-balls relates to the consistency and strength of the fluid cleaning stream exiting the spray-ball. The targets of greatest concern are those at a top head portion of the vessel having relatively small openings that become soiled with products/product vapors which can contaminate an entire batch of food product, if not effectively cleaned.

More specifically, it is common for the fluid cleaning streams of the prior art, to deteriorate, meander, or toggle back and forth, with respect to the predefined target areas to be cleaned. To combat the difficulties of the prior art, the industry has employed computer generated, custom-drilled, spray patterns to improve the directionality of the fluid cleaning streams as compared to standard or regularly-spaced drill patterns.

One solution to improve stream directionality and integrity has been to increase the L/D (length-to-diameter) ratio of the holes or apertures in the static spray-ball. While this solution improves stream directionality and integrity, i.e., as the L/D ratio is increased from about 1:1 to more than 2:1, testing has shown that turbulence inside the spray-ball effects shear, pressure and current fluctuation around and over the orifice entrance.

As a consequence, the flow rate of the fluid cleaning streams becomes inconsistent and can result in the need for multiple or redundant cleaning processes to achieve only marginally effective results. To improve the cleaning results, in some applications the industry has resorted to more complex rotary spray devices, thereby effecting three-hundred and sixty (360°) internal coverage of the spray-ball or spray-nozzle. Unfortunately, rotary devices require sensors to ensure they are operating within specification, only hit critical target areas intermittently and require regular maintenance for proper orientation.

A need, therefore, exists for a fluid cleaning device which provides consistent, uniform, and steady streams to clean predefined target areas of the processing equipment.

BRIEF SUMMARY OF THE DISCLOSURE

A fluid cleaning device is provided comprising a spheroid-shaped member defining an internal void and having an inlet orifice for receiving a cleaning fluid under pressure, the spheroid-shaped member having a wall defining a plurality of apertures; and a tubular nozzle projecting into the internal void from the inlet orifice. The tubular nozzle mitigates fluctuation of one of the internal pressure and flow velocity of the cleaning fluid within the spheroid-shaped member.

An embodiment of a fluid cleaning device is provided that includes a spheroid-shaped member defining an internal void. The spheroid-shaped member further includes a wall defining a plurality of apertures and at least partially surrounding the internal void and an inlet orifice configured to receive a cleaning fluid under pressure. A tubular nozzle projects from the inlet orifice and into the internal void and mitigates fluctuation of one of a pressure and a flow velocity of the cleaning fluid within the spheroid-shaped member.

In an embodiment, the tubular nozzle has a constant or non-varying cross-sectional geometry. In another embodiment, the tubular nozzle has a variable cross-sectional geometry. In another embodiment, the tubular nozzle tapers from the inlet orifice of the tubular nozzle to a tip end thereof. In an embodiment, the tip end of the tubular nozzle includes a flange projecting radially outwardly therefrom. In a further embodiment, the spheroid-shaped member defines a vertical diameter, a first chordal plane and a second chordal plane, each of the first and second chordal plane is oriented normal to the vertical diameter, and the tubular nozzle includes a tip end configured to extend into a region defined by and between the first and second chordal planes. In an embodiment, the region extends from about one-quarter (0.25/D) to about three-quarters (0.75/D), respectively, along the vertical diameter D. In another embodiment, the spheroid-shaped member defines a vertical diameter and a first and second chordal plane, each chordal plane disposed normal to the vertical diameter, and the tubular nozzle include a tip end configured to extend into a region defined by and between the first and second chordal planes, and the region extends from about four-tenths (0.40/D) to about six-tenths (0.60/D), respectively, along the vertical diameter D.

An embodiment of a method of manufacturing a fluid cleaning device is provided, the method includes structuring a spheroid-shaped member to define an internal void and include a wall defining a plurality of apertures and at least partially surrounding the internal void, and an inlet orifice that receives a cleaning fluid under pressure. The method further includes structuring a tubular nozzle to project from the inlet orifice and into the internal void in order to mitigate fluctuation of one of the internal pressure and flow velocity of the cleaning fluid within the spheroid-shaped member.

The above embodiments are exemplary only. Other embodiments as described herein are within the scope of the disclosed subject matter.

BRIEF DESCRIPTION OF THE DRAWINGS

So that the manner in which the features of the disclosure can be understood, a detailed description may be had by reference to certain embodiments, some of which are illustrated in the accompanying drawings. It is to be noted, however, that the drawings illustrate only certain embodiments and are therefore not to be considered limiting of its scope, for the scope of the disclosed subject matter encompasses other embodiments as well. The drawings are not necessarily to scale, emphasis generally being placed upon illustrating the features of certain embodiments. In the drawings, like numerals are used to indicate like parts throughout the various views, in which.

Corresponding reference characters indicate corresponding parts throughout several views. The examples set out herein illustrate several embodiments, but should not be construed as limiting in scope in any manner.

DETAILED DESCRIPTION

The present disclosure relates to a cleaning device for sanitary processing equipment and a method of manufacturing the cleaning device, and more particularly, to a device for directing streams of cleaning fluid into predefined internal areas of the hygienic equipment. While the disclosure describes a spheroidal cleaning device having a generally spherical shape, it will be appreciated that the teaching provided herein relates to other geometric shapes having an internal fluid reservoir. Such shapes may include oblong, elliptical, hemispherical, teardrop, octagonal, dodecahedron, etc., among others. It will be further understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back". "top", "bottom". "inner", "outer", "first", "second", and the like are not intended to limit these concepts, except where so specifically indicated. The terms "about" or "approximately" as used herein may refer to a range of 80%-125% of the claimed or disclosed value. With regard to the drawings. their purpose is to depict salient features of the disclosed cleaning device for sanitary processing equipment and method of manufacturing the cleaning device and are not specifically provided to scale.

Figure 1:
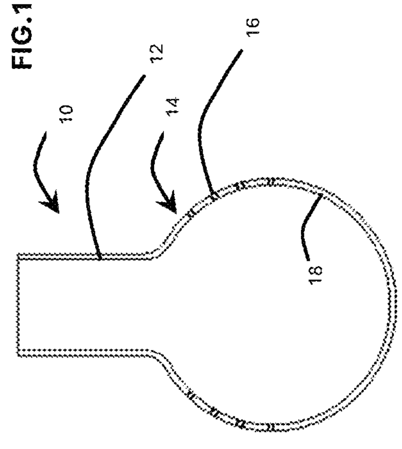
FIG.1 (Prior Art)
FIG. 1 depicts a sectional view through a prior art spray-ball for cleaning predefined target areas of an internal tank or vessel.
Figure 1A:
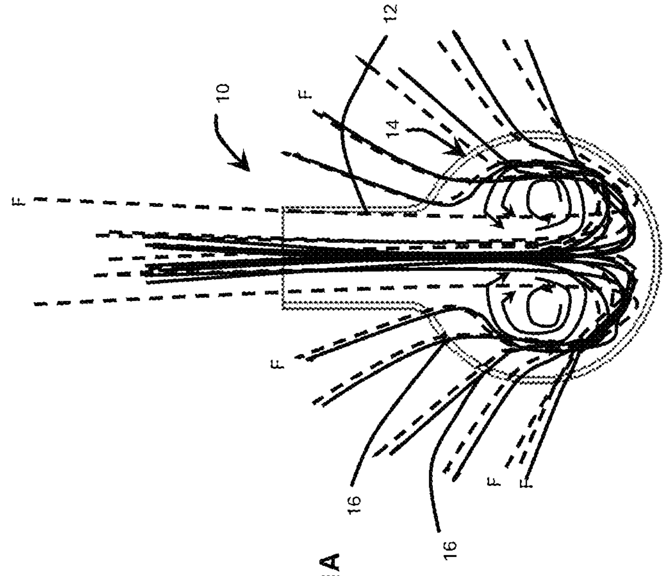
FIG.1A (Prior Art)
FIG. 1A depicts a sectional view through the prior art spray-ball of FIG. 1 depicting variations in the fluid flow streams exiting the spray-ball.

Referring to FIGS. 1 and 1A, a cross-sectional view of a typical spray-ball 10 is depicted including an elongate cylindrical tube 12 extending downwardly into a spherical member 14 having a plurality of regularly- or irregularly-spaced apertures 16 through the thickness of the spherical member 14. A supply of cleaning fluid F is pumped into the cylindrical tube 12 which redirects the flow upwardly over an internal surface 18 of the spherical member 14. As the fluid moves upwardly over the internal surface 18, the velocity of the cleaning fluid F varies as it moves over the apertures 16 thereby producing a variable velocity flow field over the apertures 16. Inasmuch as the radial pressure normal to the variable velocity flow field varies as a function of square of velocity, it will be appreciated that the radial pressure will, likewise, change with the same intensity and variability.

Figure 2:
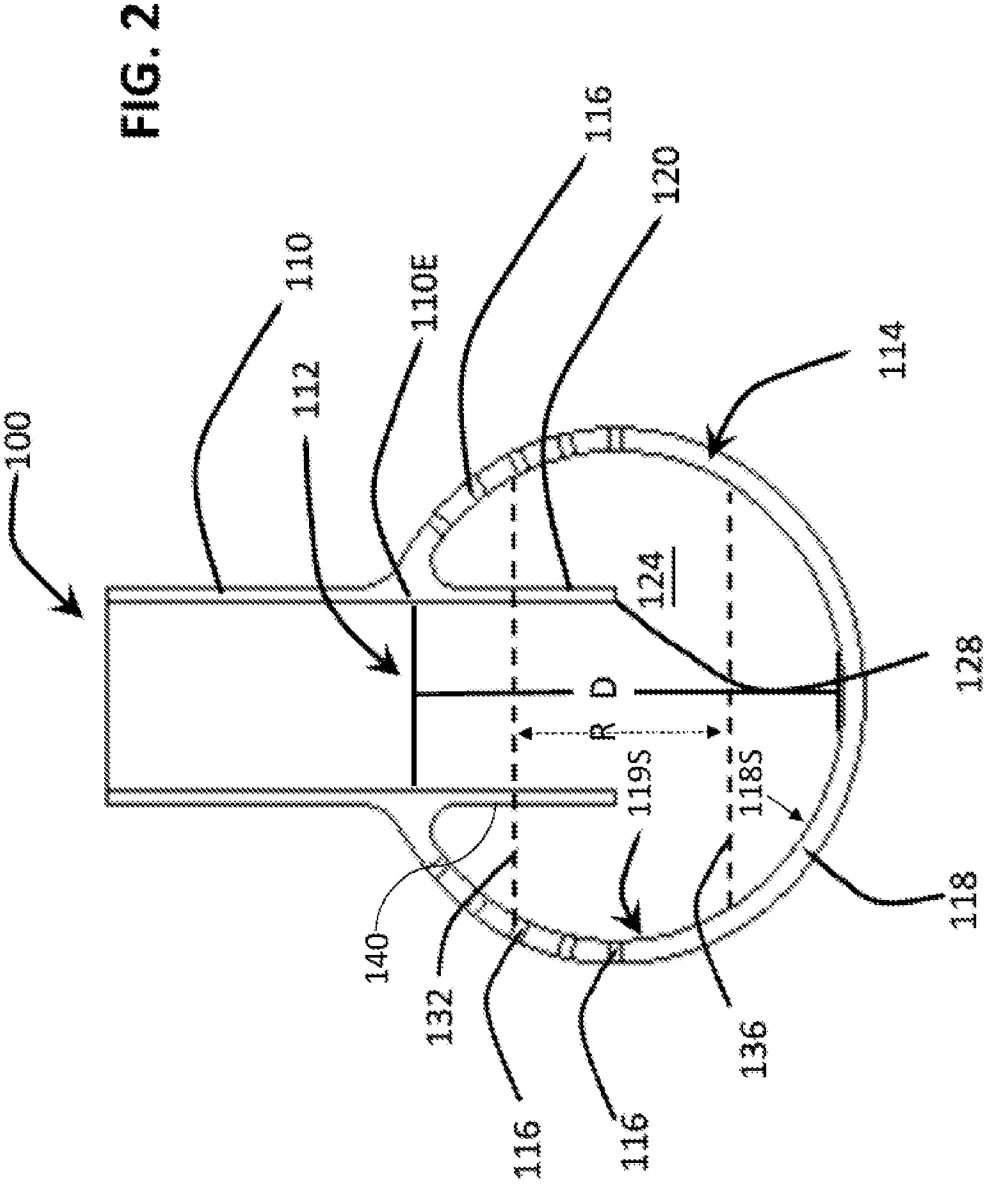
FIG. 2 depicts a sectional view through a spheroidal cleaning device according to the teachings of the present invention including a tubular inlet or nozzle extension disposed internally of the spheroidal cleaning device for the purpose of maintaining a more uniform hydrostatic pressure and flow velocity within the cleaning device to steady the fluid streams exiting the apertures of the cleaning device.

In contrast, FIG. 2 depicts a spheroidal cleaning device 100 according to the teachings of the present invention, including an elongate cylindrical tube 110 extending downwardly into an inlet orifice 112 spheroid-shaped member 114 having a plurality of regularly or irregularly-spaced apertures 116 through the wall 118 of the spheroid-shaped member 114. A supply of cleaning fluid F is pumped into the cylindrical tube 110 which redirects the flow upwardly over an internal surface 118S of the wall 118.

The spheroid-shaped member 114 includes a tubular nozzle 120 extending from the inlet orifice 112 or from the terminal end 110E of the cylindrical tube 110 into the internal void 124 of the spheroid-shaped member 114. In the described embodiment, the tubular nozzle 120 projects downwardly into the internal void 124 such that the tip end 128 of the nozzle 120 lies within a region R defined by a first chordal plane 132 normal to a diameter D extending vertically through the internal void 124 and a second chordal plane 136 normal to the same vertical diameter D. In the described embodiment, the first and second chordal planes 132, 136 lie at about one-quarter (0.25/D) to about three-quarters (0.75/D), respectively, along or down the length of the vertical diameter D. Preferably, the first and second chordal planes 132, 136 lie at about four-tenths (0.40/D) to about six-tenths (0.60/D), respectively, along or down the length of the vertical diameter D.

Figure 2A:
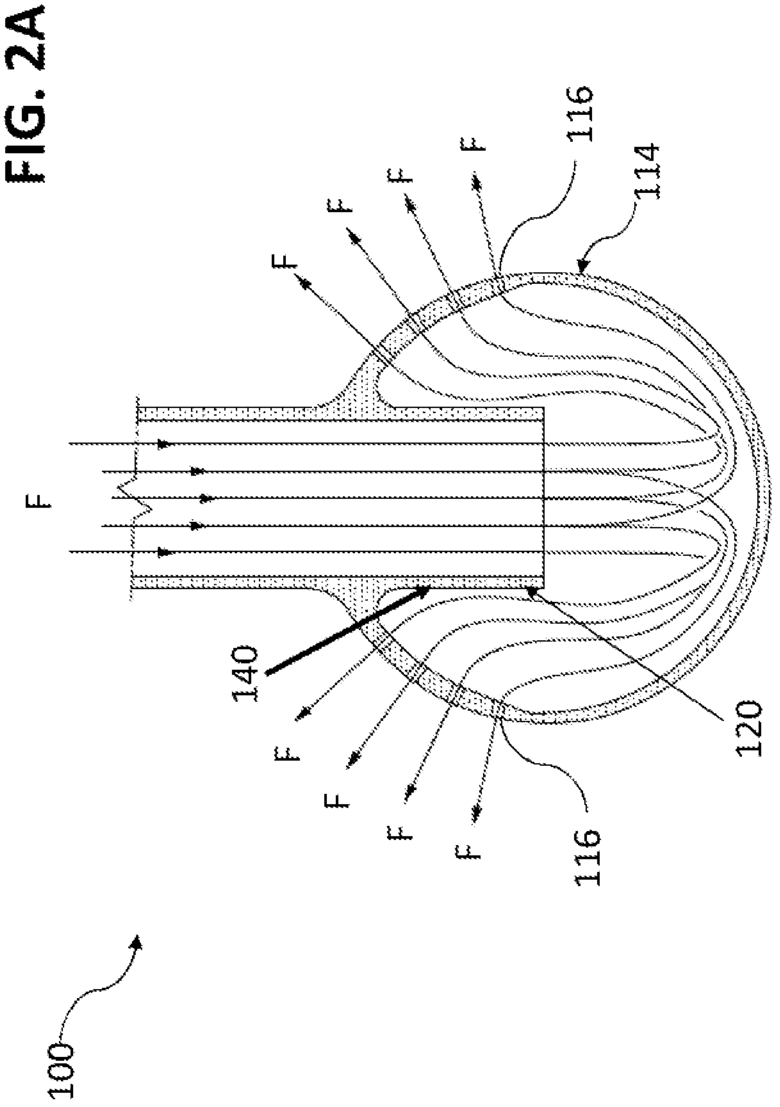
FIG. 2A depicts a sectional view through the spheroidal cleaning device of the present disclosure, i.e., shown in FIG. 2, depicting constant and steady fluid flow exiting the apertures of the spheroidal cleaning device.
Figure 2B:
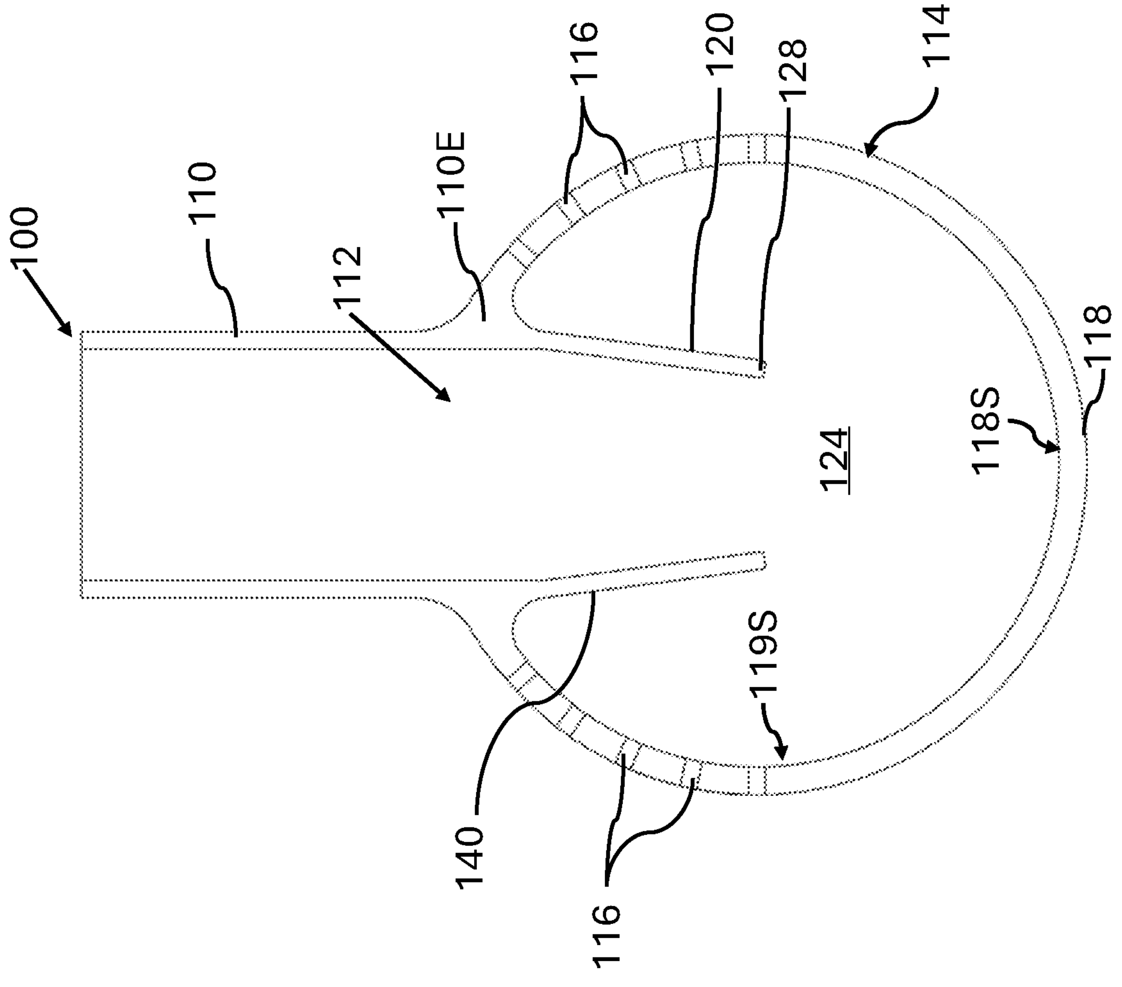
FIG. 2B depicts a sectional viewthrough another embodiment of a spheroidal cleaning device according to the teachings of the present invention including a converging tubular inlet or nozzle extension disposed internally of the spheroidal cleaning device for the purpose of maintaining a more uniform hydrostatic pressure and flow velocity within the cleaning device to steady the fluid streams exiting the apertures of the cleaning device.
Figure 2C:
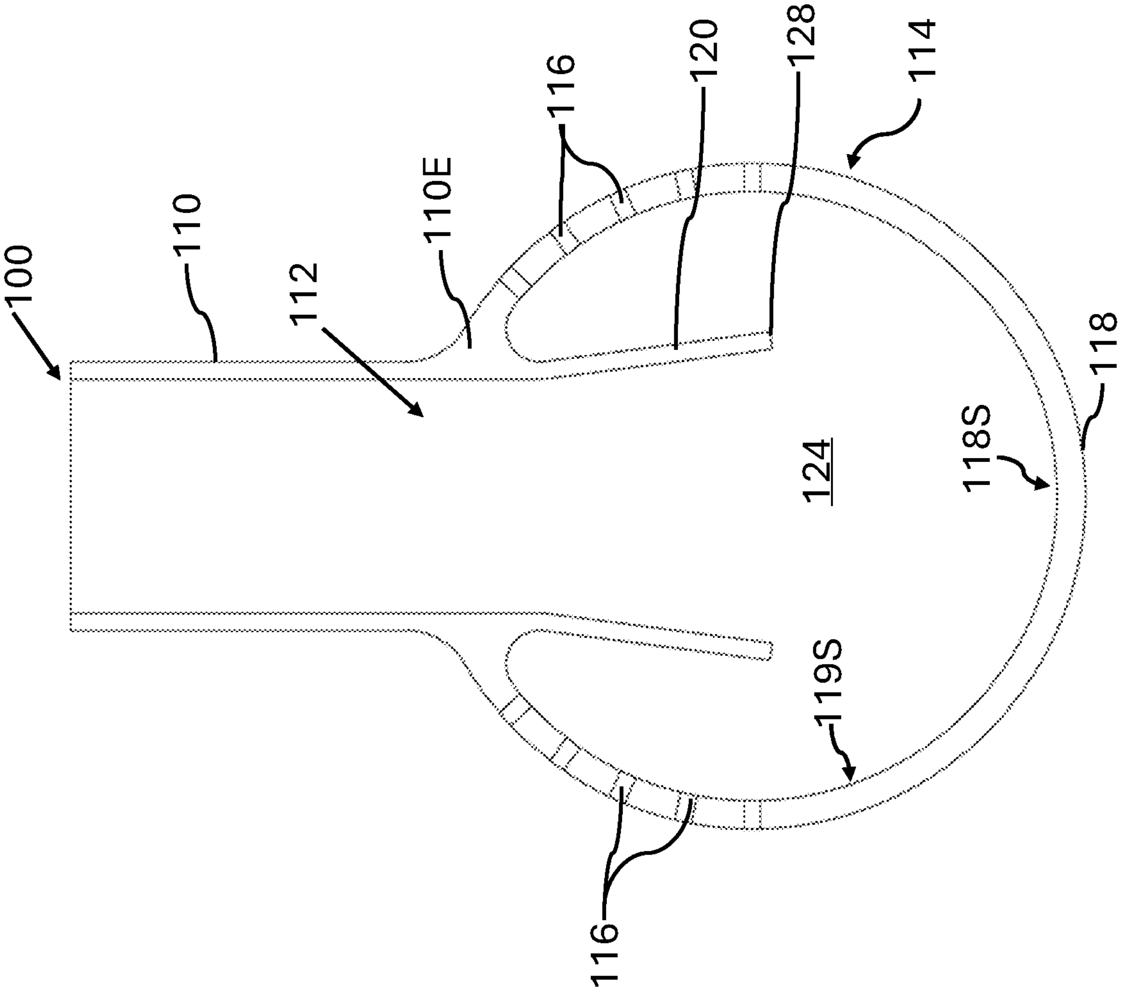
FIG. 2C depicts a sectional view through another embodiment of a spheroidal cleaning device according to the teachings of the present invention including a diverging tubular inlet or nozzle extension disposed internally of the spheroidal cleaning device for the purpose of maintaining a more uniform hydrostatic pressure and flow velocity within the cleaning device to steady the fluid streams exiting the apertures of the cleaning device.

Referring to FIGS. 2-2C, the tubular nozzle 120 may be tapered, conical, divergent, convergent, or have a constant or variable cross-sectional geometry normal to the vertical diameter D of the spheroidal cleaning device 100. The tip end 128 of the tubular nozzle 120 may or may not be flanged, i.e., outwardly or inwardly, relative to the direction of fluid flow F.

In FIGS. 2 and 2A, the spheroidal cleaning device 100 is sealed to an opening of the tank or vessel (not shown) such that the spheroidal cleaning device is disposed within the void of the tank or vessel and proximal to predefined areas targeted for cleaning. The spheroidal cleaning device 100 comprises a plurality of apertures 116 for streaming a flow of cleaning fluid to the respective targeted areas. The cleaning fluid F is pumped down a pipe or conduit leading to the spheroidal cleaning device 100 and through the tubular nozzle 120 disposed internally of the spheroidal cleaning device 100. Upon exiting the tubular nozzle 120, the fluid F is pumped downwardly against the lower internal surface 118S of the spheroidal cleaning device and redirected upwardly along the side and upper internal surfaces 119S of the spheroidal cleaning device 100. The external surface 140 of the tubular nozzle 120 steadies the internal flow of cleaning fluid so as to mitigate fluctuation of fluid pressure and flow velocity within the void 124 of the spheroidal cleaning device 100. That is, since fluctuations in the flow velocity are reduced by the tubular nozzle 120, pressure variations are also steadied which allows for consistent and uniform flow of cleaning solution through each of the apertures 116. The consistent and uniform flow of cleaning solution through each of the apertures 116 results in a neater and more consistent cleaning.

In summary, the embodiments illustrated and disclosed herein solve industry wide problems of marginal cleaning of target areas in vessels by improving the consistency and uniformity of streams of cleaning fluid. The disclosure introduces an internal structure which alters fluctuations associated with the internal flow, i.e., mitigating variations of internal pressure and flow velocity, within the spheroid-shaped member. As a consequence, the fluid streams consistently spray the predefined target areas for cleaning.

Additional embodiments include any one of the embodiments described above, where one or more of its components, functionalities or structures is interchanged with, replaced by or augmented with one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A fluid cleaning device, comprising:

a spheroid-shaped member defining an internal void defining a vertical diameter, and comprising;

a wall defining a plurality of apertures and including a lower internal surface and an upper internal surface, wherein the plurality of apertures are confined to the upper internal surface, and an inlet orifice configured to receives a cleaning fluid under pressure; and a tubular nozzle comprising an external surface that projects from the inlet orifice parallel to the vertical diameter and into the internal void, wherein the tubular nozzle is structured to:

direct the cleaning fluid along the vertical diameter and against the lower internal surface, and direct the cleaning fluid upward from the lower internal surface along the upper internal surface and against the external surface to mitigate fluctuation of one of a pressure and a flow velocity of the cleaning fluid within the spheroid-shaped member and produce uniform flow of the cleaning fluid through each of the plurality of apertures.

2. The fluid cleaning device of claim 1, wherein the tubular nozzle comprises a constant cross-sectional geometry.

3. The fluid cleaning device of claim 1, wherein the tubular nozzle comprises a variable cross-sectional geometry.

4. The fluid cleaning device of claim 1, wherein the tubular nozzle tapers from the inlet orifice of the tubular nozzle to a tip end thereof.

5. The fluid cleaning device of claim 1, wherein:

the spheroid-shaped member defines a first chordal plane and a second chordal plane, each of the first and second chordal plane is oriented normal to the vertical diameter; and wherein the tubular nozzle comprises a tip end configured to extend into a region defined by and between the first and second chordal planes.

6. The fluid cleaning device of claim 5, wherein the region extends from about one-quarter to about three-quarters, respectively, along the vertical diameter.

7. The fluid cleaning device of claim 1, wherein:

the spheroid-shaped member defines a first and second chordal plane, each chordal plane disposed normal to the vertical diameter;

the tubular nozzle comprises a tip end configured to extend into a region defined by and between the first and second chordal planes; and the region is configured to extend from about four-tenths to about six-tenths, respectively, along the vertical diameter.

8. A method of manufacturing a fluid cleaning device, comprising:

structuring a spheroid-shaped member to define an internal void and a vertical diameter, the internal void comprising;

a wall including a lower internal surface and an upper internal surface, wherein the wall defines a plurality of apertures confined to the upper internal surface, and an inlet orifice configured to receive a cleaning fluid under pressure; and structuring a tubular nozzle to:

comprise an external surface that projects from the inlet orifice parallel to the vertical diameter and into the internal void, and direct the cleaning fluid parallel to the vertical diameter and against the lower internal surface and upward along the upper internal surface and against the external surface of the tubular nozzle to mitigate fluctuation of one of an internal pressure and a flow velocity of the cleaning fluid within the spheroid-shaped member and produce uniform flow of the cleaning fluid through each of the plurality of apertures.

9. The method of claim 8, further comprising structuring the tubular nozzle to comprise a constant cross-sectional geometry.

10. The method of claim 8, further comprising structuring the tubular nozzle to comprise a variable cross-sectional geometry.

11. The method of claim 8, further comprising structuring the tubular nozzle to taper from the inlet orifice of the tubular nozzle to a tip end thereof.

12. The method of claim 8, further comprising:

structuring the spheroid-shaped member to define a first chordal plane and a second chordal plane, where each of the first and second chordal plane is oriented normal to the vertical diameter; and structuring the tubular nozzle to comprise a tip end configured to extend into a region defined by and between the first and second chordal planes.

13. The method of claim 12, further comprising extending the region from about one-quarter to about three-quarters, respectively, along the vertical diameter.

14. The method of claim 8, further comprising structuring:

the spheroid-shaped member to define a first and second chordal plane, where each chordal plane is positioned normal to the vertical diameter;

the tubular nozzle to comprise a tip end configured to extend into a region defined by and between the first and second chordal planes; and the region to extend from about four-tenths to about six-tenths, respectively, along the vertical diameter.

* * * * *